United States Patent
Peiffer et al.

(10) Patent No.: US 6,291,053 B1
(45) Date of Patent: Sep. 18, 2001

(54) MULTILAYER BIAXIALLY ORIENTED POLYESTER FILM, AND THE USE THEREOF, AND PROCESS FOR THE PRODUCTION THEREOF

(75) Inventors: Herbert Peiffer, Mainz; Guenther Crass, Taunusstein-Wehen; Richard Lee Davis, Wiesbaden, all of (DE)

(73) Assignee: Hoechst Diafoil GmbH, Wiesbaden (DE)

( * ) Notice: Subject to any disclaimer, the term of this patent is extended or adjusted under 35 U.S.C. 154(b) by 0 days.

(21) Appl. No.: 09/158,519

(22) Filed: Sep. 22, 1998

(30) Foreign Application Priority Data

Sep. 23, 1997 (DE) .............................................. 197 41 878

(51) Int. Cl.[7] .............................. B32B 5/16; B32B 5/22; B32B 27/04; B32B 27/36; B32B 31/30
(52) U.S. Cl. ............................ 428/141; 428/336; 428/339; 428/458; 428/480; 428/910; 264/172.19
(58) Field of Search ................................ 428/141, 331, 428/332, 336, 339, 457, 458, 480, 910; 264/172.19

(56) References Cited

U.S. PATENT DOCUMENTS

| | | | |
|---|---|---|---|
| 3,515,626 | 6/1970 | Duffield | 161/162 |
| 3,958,064 | 5/1976 | Brekken et al. | 428/336 |
| 4,042,569 | 8/1977 | Bell et al. | 528/272 |
| 4,252,885 | 2/1981 | McGrail et al. | 430/160 |
| 4,399,179 | 8/1983 | Minami et al. | 428/212 |
| 4,493,872 | 1/1985 | Funderburk et al. | 428/332 |
| 4,615,939 | 10/1986 | Corsi et al. | 428/323 |
| 4,622,237 | 11/1986 | Lori | 427/40 |
| 5,236,680 | 8/1993 | Nakazawa et al. | 423/328.1 |
| 5,236,683 | 8/1993 | Nakazawa et al. | 423/335 |
| 5,242,757 | 9/1993 | Buisine et al. | 428/480 |
| 5,328,755 | * 7/1994 | Mills et al. | 428/215 |
| 5,429,785 | 7/1995 | Jolliffe | 264/216 |
| 5,453,260 | 9/1995 | Nakazawa et al. | 423/327.1 |
| 5,468,527 | 11/1995 | Peiffer et al. | 428/35.7 |
| 5,506,014 | 4/1996 | Minnick | 428/35.7 |
| 5,656,356 | * 8/1997 | Masuda et al. | 428/141 |
| 5,747,174 | * 5/1998 | Kimura et al. | 428/480 |
| 5,783,017 | * 7/1998 | Boswell | 156/231 |
| 5,914,220 | * 6/1999 | Murayama | 430/349 |

FOREIGN PATENT DOCUMENTS

| | | |
|---|---|---|
| 1 694 404 | 4/1971 | (DE) . |
| 22 30 970 | 2/1973 | (DE) . |
| 3801535 | 7/1988 | (DE) . |
| 4306155 | 9/1994 | (DE) . |
| 0 035 835 | 9/1981 | (EP) . |
| 0 061 769 | 10/1982 | (EP) . |
| 0 088 635 | 9/1983 | (EP) . |
| 0 124 291 | 11/1984 | (EP) . |
| 0 135 451 | 3/1985 | (EP) . |
| 0 144 878 | 6/1985 | (EP) . |
| 0 236 945 | 9/1987 | (EP) . |
| 0 296 620 | 12/1988 | (EP) . |
| 0 347 646 | 12/1989 | (EP) . |
| 0 368 278 A2 | 5/1990 | (EP) . |
| 0 378 154 | 7/1990 | (EP) . |
| 0 378 955 | 7/1990 | (EP) . |
| 0 402 861 | 12/1990 | (EP) . |
| 0 490 665 | 6/1992 | (EP) . |
| 0 502 745 | 9/1992 | (EP) . |
| 0 514 129 | 11/1992 | (EP) . |
| 0 515 096 | 11/1992 | (EP) . |
| 0 580 404 | 1/1994 | (EP) . |
| 0 602 964 | 6/1994 | (EP) . |
| 0 604 057 | 6/1994 | (EP) . |
| 0 609 060 | 8/1994 | (EP) . |
| 0 612 790 | 8/1994 | (EP) . |
| 0 624 454 A1 | 11/1994 | (EP) . |
| 0 659 810 | 6/1995 | (EP) . |
| 0 663 286 | 7/1995 | (EP) . |
| 0 678 554 A1 | 10/1995 | (EP) . |
| 0 685 509 | 12/1995 | (EP) . |
| 0 707 979 | 4/1996 | (EP) . |
| 0 826 478 | 3/1998 | (EP) . |
| WO 94/13476 | 6/1994 | (WO) . |
| WO 94/13481 | 6/1994 | (WO) . |
| WO 98/13414 | 4/1998 | (WO) . |
| WO 98/13415 | 4/1998 | (WO) . |
| WO 88/10188 | 12/1998 | (WO) . |

OTHER PUBLICATIONS

Encyclopedia of Polymer Science and Engineering, vol. 1: Additives, pp. 472–475, Aug. 1985.*

Database WPI, Section Ch, Week 199732, Derwent Publications Ltd., London, GB; Class A23, AN 1997–346220, XP002143058 & JP 09 141797 A (Toray Ind Inc), Jun. 3, 1997 (1997–06–03).

Kimura, S.F. et al., FTIR Spectroscopic Study on Crystallization Process of Poly (ethylene–2,6–naphthalate), 35 Journal of Polymer Science: Polymer Physics 2741–2747 (1997).

(List continued on next page.)

Primary Examiner—Paul Thibodeau
Assistant Examiner—Ramsey Zacharia
(74) Attorney, Agent, or Firm—Finnegan, Henderson, Farabow, Garrett & Dunner, L.L.P.

(57) ABSTRACT

The invention relates to a biaxially oriented polyester film which has at least three layers and has better optical properties than films of the prior art together with very good processing performance, and, after it is metalized or coated with oxidic materials, is a good barrier to oxygen, and which is built up on each side from at least one base layer B and outer layers A and C applied to this base layer, where these outer layers have a defined number of elevations of a defined height and diameter. The invention further relates to the use of the film and to a process for the production thereof.

18 Claims, 5 Drawing Sheets

OTHER PUBLICATIONS

Bursch et al., "Biaxially Oriented Polyester Film for SMD Condensers—Made by Extrusion Followed by Biaxially Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9615, Derwent Publications Ltd., London, GB; Class A23, AN 96–148338, XP002114377 & JP 08 03679 A (Toray Indus., Inc.) (Feb. 6, 1996).

Database WPI, Section Ch, Week 9522, Derwent Publications Ltd., London, GB; Class A32, AN 95–166886, XP002114408 & JP 07 088592 A (Toray Indus., Inc.) (Apr. 4, 1995).

J. Weiss, Parameters That Influence The Barrier Properties of Metallized Polyester and Polypropylene Films, Thin Solid Films 204 (1991) pp. 203–216.

H. Utz, Technische Universitat Munchen 1995: Barriere–eigenschaften aluminiumbedampfter Kunststoffolien, pp. 66–68.

* cited by examiner

OXYGEN TRANSMISSION OTR: 0.7 cm³/m² d bar

ROUGHNESS $R_a$:  65nm

FIGURE 1a: GOOD OXYGEN BARRIER

OXYGEN TRANSMISSION OTR: 3.2 cm³/m² d bar

ROUGHNESS $R_a$:  8nm

FIGURE 1b: POOR OXYGEN BARRIER

MULTILAYER BIAXIALLY ORIENTED POLYESTER FILM, AND THE USE THEREOF, AND PROCESS FOR THE PRODUCTION THEREOF

The invention relates to a biaxially oriented polyester film which has at least three layers and has better optical properties than films of the prior art together with very good processing performance, and, after it is metalized or coated with oxidic materials, is a good barrier to oxygen, and which is built up on each side from at least one base layer B and outer layers A and C applied to this base layer, Where these outer layers have a defined number of elevations of a defined height and diameter. The invention further relates to the use of the film and to a process for the production thereof.

BACKGROUND OF THE INVENTION

1. Field of the Invention

Biaxially oriented polyester films are used in packaging and in industry primarily where there is a need for their advantageous properties, i.e. good optical properties, high mechanical strengths, good barrier effect, in particular against gases, good dimensional stability when heated and excellent layflat.

For most applications it is also desirable, e.g. for reasons of effective presentation, to improve the optical properties of the polyester films, in particular the gloss and the film haze. With this, the other performance characteristics of polyester films, in particular its good processability and its good barrier properties, should be retained at least or likewise improved.

2. Description of the Related Art

The prior art demonstrates how the optical properties, in particular the gloss and the haze, of biaxially oriented polyester films can be improved.

EP0 514 129 describes a transparent multilayer film which comprises a substrate of a primary layer of polymer material which, at least on one of its surfaces, has a secondary layer of polymer material which has certain concentrations and certain size distributions of glass beads and silica particles. The secondary layer can be arranged on one or on both sides of the primary layer substrate. The haze and processing properties are improved with the film, but no improvement in the gloss and the barrier properties of the film is provided in the text. There is also no indication of any kind in the text as to how the topography of such a film should be adjusted for simultaneous improvement of gloss and oxygen barrier.

EP 0 604 057 describes a transparent multilayer film which comprises a substrate of a primary layer of polymer material which is essentially free from fillers and which, at least on one of its surfaces, has a secondary layer of polymer material which contains-, as filler, in a concentration of from 100 to 1000 ppm, silicone resin having an average particle diameter of from 1.5 to 12.5 $\mu$m. A disadvantage of the silicone particles is that they are comparatively expensive and do not provide an acceptable solution for the packaging market. In addition, films which are provided with pigments of this type tend to telescope more easily during reeling. In this text there is likewise no indication of any type as to how the topography of such a film should be adjusted for simultaneous improvement of gloss and oxygen barrier.

In many foodstuff packaging applications, there is demand for a high barrier effect against gases, steam and flavors (this having the same significance as low transmission or low permeability). A well known process for producing packaging of this type consists in high-vacuum aluminum metalizing of the plastic films used. Other well known processes consist in coating the films with oxidic materials (e.g. $SiO_x$ or $Al_xO_y$) or water glass. Essentially, the coatings used are transparent.

The barrier effect against the substances mentioned above depends essentially on the type of the polymers in the film and the quality of the barrier layers applied. Thus, a very high barrier effect against gases, such as oxygen and flavors, is achieved in metalized, biaxially oriented polyester films. A barrier effect against steam is achieved in metalized, biaxially oriented polypropylene films.

The good barrier properties of metalized or oxidically coated films mean that they are used in particular for packaging foodstuffs and luxury foods, for which long storage or transport times create the risk that the packaged foodstuffs become spoilt, rancid or lose flavor if there is an inadequate barrier; examples are coffee, snacks containing fats (nuts, potato chips, etc.) and drinks containing carbon dioxide (in pouches).

If polyester films metalized with an aluminum layer or having an applied oxidic layer are used as packaging material, they are generally a constituent of a multilayer composite film (laminate). Bags produced therefrom can be filled, for example, on a vertical tubular bag forming, filling and sealing machine. The bags are heat-sealed on their inward side (i.e. on the side facing the contents), the heat-sealable layer consisting generally of polyethylene or polypropylene. The composite film here typically has the following structure: polyester layer/aluminum or oxide layer/adhesive layer/heat-sealable layer. If the laminate thickness is from about 50 to 150 $\mu$m, the thickness of the metal or oxide layer is only from 10 to 80 nm. Even this very thin functional layer is sufficiently effective to achieve adequate protection from light and very good barrier properties. The oxygen barrier or the oxygen transmission is generally measured not on the laminate or the packaging itself, but on the metalized polyester film. To ensure good quality of the foodstuffs or luxury foods even after relatively long storage times, the oxygen transmission (identical with permeability) of the metalized film may not be greater than 2 $cm^3/m^2$ bar d, but in particular not greater than 1.5 $cm^3/m^2$ bar d. In future, the demands of the packaging industry will head toward still higher barriers, with attempts to achieve permeability values of significantly less than 1.0 $cm^3/m^2$ bar d for metalized or oxidically coated films.

In the prior art, there is neither sufficient knowledge of the detailed basis for the barrier effect of metalized or oxidically coated polyester films nor of how this may be decisively improved. Variables which are clearly important are the area of the substrate and the type of substrate polymer and its morphology. It is generally assumed that smooth substrate surfaces result in better barrier properties.

In this connection, Weiss et al., in "Thin Solids Films" 204 (1991), p. 203–216, studied the influence of the surface roughness of a substrate layer on the permeability. For this, polyester films were coated with lacquer which contained various concentrations of titanium dioxide particles. In the experiments described, the concentrations of titanium dioxide particles in the lacquer varied from 2 to 20% by weight. Using this method, the surface roughness $R_a$ of the coated substrate surface could be varied from 43 nm (unlacquered and lacquered film, without titanium dioxide) to 124 nm. In his experiments, increasing roughness (increasing proportion of $TiO_2$) of the lacquered surface resulted in markedly higher oxygen transmissions after metalizing with aluminum. However, the largest step increase in oxygen transmission was seen when the lacquered film (0% by weight) was compared with the unlacquered film, although the surface roughness of the substrate was the same in both cases. The lacquering alone of the film gave a deterioration in the barrier from about 0.43 cm$^3$/m$^2$ d bar (plain film) to about 19 cm$^3$/m$^2$ d bar (lacquered film). A further uncertainty concerning the transferability of this work to commercial products is created by the fact that the aluminum layer was applied using a laboratory evaporator. When compared with an industrial metalizer, this method achieves essentially low permeability values, and the influence of the substrate surface on the barrier properties cannot be seen clearly.

Other detailed results of studies on the influence of the substrate surface of polyester films on their barrier properties can be found in the dissertation by H. Utz (Technische Universität München 1995: "Barriereeigenschaften aluminiumbedampfter Kunststoffollien" [Barrier properties of aluminum-metalized plastic films]).

According to the studies by Utz (pp. 66 ff.), there is no direct correlation between the surface roughness (average roughness height $R_a$) of the PET film and its oxygen barrier. For example, the film for video applications which, with an average roughness height of $R_a$=22 nm, is highlighted as particularly smooth, has, at 1.3 cm$^3$/m$^2$ bar d, an oxygen transmission of 1.2 cm$^3$/m$^2$ bar d comparable with the much rougher PET II film ($R_a$=220 nm).

EP-A-0 124 291 describes a single-layer biaxially oriented polyester film for magnetic recording tape which has the following surface property parameters
a) the average roughness $R_a$ is from 1 nm to 16 nm,
b) the coefficient of friction $\mu$k is from 0.01 to 0.20 and
c) the following relationship exists between $R_a$ and $\mu$k $$0.1<10*R_a+\mu k<0.31.$$

These properties are created by using TiO$_2$ particles (anatase) or TiO$_2$ and CaCO$_3$ particles in a proportion by weight of, respectively, from 0.1 to 0.5% and from 0.1 to 0.3%. The diameter of the TiO$_2$ particles is from 0.1 to 0.5 $\mu$m. The surface of this film is formed by a large number of elevations/protrusions which obey a distribution such that the graph described by the following relationship $$\log y=-8.0x+4.34, y>10$$

is not intersected. In this equation, x ($\mu$m) is a height above a standard level and y is the number of elevations (number/mm$^2$) if the elevations are sectioned at a height of x. The distribution of the elevations is determined using standard equipment for measuring roughness. According to this text, although the processing properties of the film are improved, no information is provided on improvement of the gloss, the haze and the barrier properties of the film. There is also no indication of any kind in the text as to how the topography of a film of this type should be adjusted for simultaneous improvement of gloss and oxygen barrier.

EP-A-0 490 665 A1 describes a single-layer biaxially oriented polyester film for magnetic recording tape; the film contains
a) from 0.05 to 1.0% by weight of ω-alumina having an average particle diameter in the range from 0.02 to 0.3 $\mu$m, and
b) from 0.01 to 1.5% by weight of inert particles of a type other than ω-alumina and having an average particle diameter in the range from 0.1 to 1.5 $\mu$m, these particles being larger than the ω-alumina particles.

The surface of this film is formed by a large number of elevations/protrusions which are described by the relationship $$-11.4x+4<\log y<-10.0x+5\ y>30,\ x>0.05\ \mu m$$

In this equation, x ($\mu$m) is a height above a standard level and y is the number of elevations (number/mm:$^2$) if the elevations are sectioned at a height of x. The distribution of the elevations is measured as in EP-A-0 124 291. This text, like that mentioned above, gives no information concerning improvement of the gloss, the haze and the barrier properties. It also gives no indication of any type as to how the topography of such a film should be adjusted for simultaneous improvement of gloss and oxygen barrier.

The prior art also discloses films which have different roughnesses on their two surfaces (dual surface). These films are suitable in particular for magnetic recording media and essentially have different topographies (e.g. surface A smooth, surface B rough). These texts generally provide means of improving the processing properties of the film but not its optical properties. In particular, however, these texts do not provide any means of improving the barrier properties of the film.

DE-A-16 94 404 describes a layered material having more than one layer of an oriented crystallizable thermoplastic film and in which at least one of the outer layers contains an additive. The additives are customary inert inorganic or organic particles, and in the case of inert particles such as SiO$_2$, are added to the outer layers in concentrations of from 1 to 25% by weight, the particle size being front 2 to 20 $\mu$m. The layered materials may, for example, be metalized with aluminum for decorative uses or used for magnetic tape. Although this text provides a means to improve the processing properties and the haze of the film, it does not provide a means for improving the gloss and the barrier properties of the film. The text also gives no indication of any type as to how the topography of such a film should be adjusted for simultaneous improvement of gloss and oxygen barrier.

DE-A-22 30 970 describes a magnetic recording medium which is composed of a biaxially oriented polyester film and a thin magnetic metallic layer on the surface A of the polyester film. The film comprises
a) a coated surface A, which is free from particles and
  i) is at least 4 $\mu$m thick or
  ii) makes up at least 50% of the thickness of the entire film layer; and
b) a second layer containing particles and having a relatively rough surface, and containing
  i) at least 1% of individual particles of a particular polymer A and
  ii) at least 1% of individual particles of a particular polymer B.

A disadvantage of the film is that the surface A tends to block, so that the film does not process well. The text does not disclose a means for improving the gloss, the haze and the barrier properties of the film. Once again, there are also no indications of any type in the text as to how the topography of such a film should be adjusted for simultaneous improvement of gloss and oxygen barrier.

EP-B-0 061 769 describes a magnetic recording medium which is formulated from a biaxially oriented polyester film and a thin magnetic metallic layer on the surface A of the polyester film. If desired, there is also a lubricant layer on the other surface B of the polyester film. Features of the film are that the coated surface A a) has an average roughness $R_a$ (peak-valley value) of not more than 5 nm (60 nm),
b) the number of protrusions having a height of from 0.27 to 0.54 μm is from 0 to 0.2 per mm² and
c) is free from protrusions having a height greater than 0.54 μm.

A disadvantage of the film is that the surface A tends to block, so that the film does not process well. The text gives no teaching on improvement of the gloss, the haze and the barrier properties of the film. There is also no indication of any type in the text as to how the topography of such a film should be adjusted for simultaneous improvement of gloss and oxygen barrier.

EP-B-0 088 635 describes a coextruded biaxially oriented polyester film having at least two layers, of which a layer A consists of thermoplastic resin and a layer B comprises thermoplastic resin and fine particles. The surface roughness $R_a$ of the outer surface of the layer A in the film is less than 5 nm and the outer surface of the layer B is either i) a surface having a surface roughness $R_a$ of from 5 to 40 nm and a large number of depressions and a large number of protrusions which are arranged in a particular arrangement or ii) a surface which has protrusions formed on a level area and which is covered by a layer C, which consists of a lubricant and has a surface roughness $R_a$ of from 5 to 40 nm.

A disadvantage of film surface A is that it blocks, both with itself and with certain other surfaces (e.g. rubber rolls). The film cannot be processed cost-effectively; in particular during metalizing in vacuo, the film, because of its high tendency to block, tends to tear, and this can cause great cost problems. The film is unsuitable for the purposes of the object to be achieved. In addition, the haze of the film is unsatisfactory.

EP-B-0 502 745 describes a coextruded biaxially oriented polyester film having at least three layers, of which an outer layer A a) contains inorganic particles having an average primary particle size D in the range from 1 to 100 nm and satisfying the equation D<T<200D, where T is the thickness of the layer A and
b) contains particles B having an average primary particle size D1 in the range from 0.3 to 2 μm, where the primary particle size distribution has a coefficient of variation of not more than 0.6 and
c) the average primary particle size D of the particles A is smaller than the average primary particle size D1 of the particles B.

The processing behavior of the film, in particular, is improved by applying the teaching of this text. The text does not give any teaching on improving the gloss, the haze or the barrier properties of the film. The text also gives no indication of any type as to how the topography of such a film should be adjusted for simultaneous improvement of gloss and oxygen barrier.

BRIEF SUMMARY OF THE INVENTION

It has been an object of the present invention to provide a coextruded, biaxially oriented polyester film which has very good optical properties and in particular has very high gloss and very low haze. After metalizing or after coating with oxidic materials, the film should also exhibit a good oxygen barrier and it should be very easy to produce and to process. In summary, the object was to provide a film having the following combination of features:

high gloss,
low haze,
low oxygen permeability of the film after metalization or after coating with oxidic materials,
low coefficients of friction.

DETAILED DESCRIPTION OF THE INVENTION

The gloss of the film should be greater than 170 and the haze should be less than 1.6. Less than 1.0 cm³ of oxygen per square meter and per day should diffuse through the film when it is subjected to an air pressure of 1 bar. In its other properties, the film should be at least equivalent to the known packaging films of this type,. In addition, it should be simple and economic to produce and process very well on conventional machinery. The coefficient of friction on both surfaces should be less than 0.5.

The object has been achieved by means of a biaxially oriented, coextruded polyester film which has at least three layers and has at least one base layer B which is composed to an extent of at least 80% by weight of a thermoplastic polyester and has, applied to this base layer, outer layers A and C, which contain internal and/or inert particles, where the outer layers A and C have a number of elevations/protrusions N per mm² of film surface area which is related to their respective heights h and diameter d by the following equations $$A_{h1}-B_{h1}*\log h/\mu m < \log N/mm^2 < A_{h2}-B_{h2}*\log h/\mu m \qquad (1)$$

$$0.01 \ \mu m < h < 10 \ \mu m$$

$A_{h1}=-1.000; B_{h1}=3.70$
$A_2=2.477; B_{h2}=2.22$ $$A_{d1}-B_{d1}*\log d/\mu m < \log N/mm^2 < A_{d2}-B_{d2}*\log d/\mu m \qquad (2)$$

$$0.4 \ \mu m < 10 \ \mu m$$

$A_{d1}=1.700; B_{d1}=3.86$
$A_{d2}=4.700; B_{d2}=2.70$.

For the purposes of the present invention, elevations/protrusions are understood to mean conical elevations/protrusions which project from the flat surface of the film.

Internal particles are understood to mean catalyst residues which remain in the raw material during preparation of the polyester raw material.

Inert particles are understood to mean particles which are added to the raw material, for example during its preparation.

To achieve the desired oxygen permeability (less than 1.0 cm³ m² d⁻¹ bar⁻¹) in metalized or oxidically coated films, the number N of elevations/protrusions per mm² of film surface must, in accordance with equations (1) and (2), be below a particular numerical value. This numerical value is defined by the right-hand side of equations (1) and (2) as a function of the height h and the diameter d of the elevations/protrusions.

A requirement for achieving good oxygen barriers in metalized or oxidically coated films is a low density N/mm² of elevations/protrusions on the film surface to be metalized or oxidically coated. If the density N/mm² of the elevations/protrusions is small (FIG. 1a), the barrier in the above sense is good, and in contrast if the density of the elevations/protrusions is great (FIG. 1b), the barrier in the above sense is then poor.

Figure 1A:
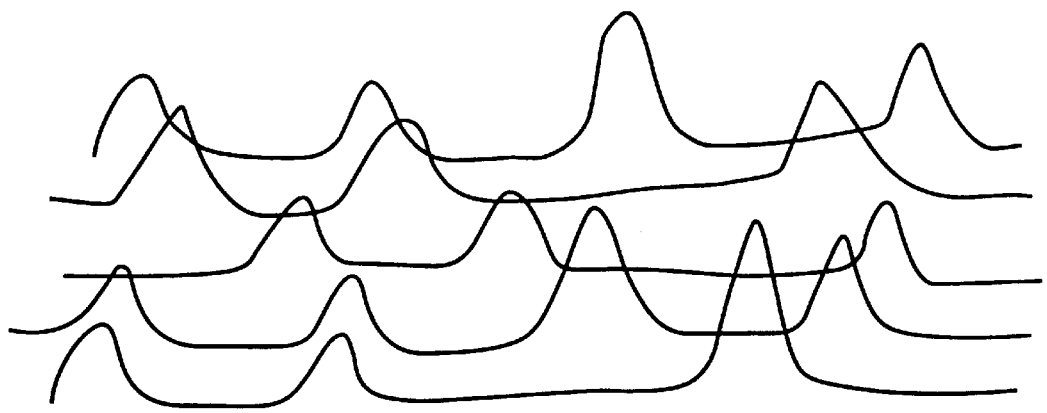
FIG. 1a is a diagrammatic illustration of films which exhibit a good oxygen barrier.
Figure 1B:
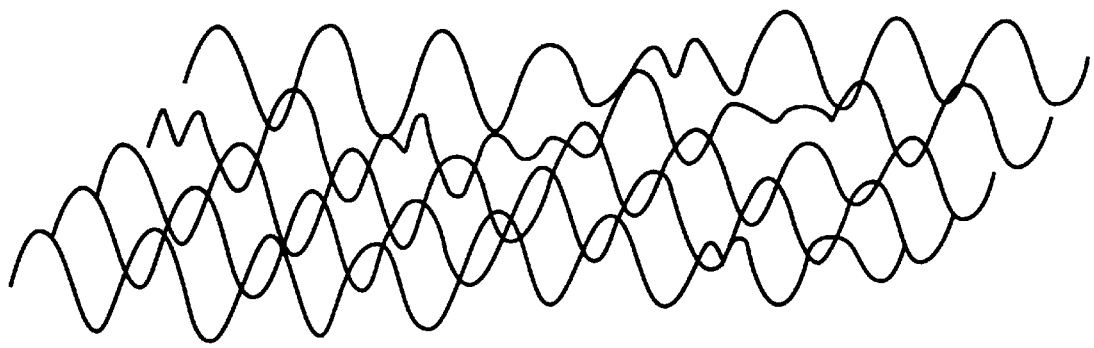
FIG. 1b is a diagrammatic illustration of films which exhibit a poor oxygen barrier.

The diagrams in FIGS. 1a and 1b also show that in principle the value of $R_a$ has no influence on the barrier properties. A smooth film (e.g. $R_a$<10 nm) here may exhibit a very poor barrier if the number N/mm² of elevations/protrusions is greater than that calculated by the right-hand sides of equation s (1) a nd (2). In this case, the surface/surface layer contains very many fine particles, but these do not contribute significantly to the value of $R_a$. A surface of this type is not at all suitable for achieving high barrier values. In contrast, film surfaces which have comparatively few elevations/protrusions N per unit of surface area are very suitable for achieving high barrier values. It is of relatively subordinate significance here whether the elevations/protrusions are the result of large particles or of small particles.

If the number N of elevations per unit of surface are a on the film surface which is to be metalized or oxidic-ally coated is greater than the value of the right-hand side of equation (1) or (2), then the oxygen permeability is greater than 1.0 cm³/m² bar d, and this is undesirable for the object of the present invention. The gloss of this film surface (in its unmetalized or uncoated condition) is then moreover no longer sufficiently high to meet the requirements of the object of the present invention.

In a preferred embodiment of the novel film, the constants $A_{h1}$ to $B_{h2}$ in equation (1) have the values $A_{h1}$=−0.523, $B_{h1}$=3.523, $A_{h2}$=2.300 and $B_{h2}$=2.3, in a particularly preferred embodiment the values are $A_{h1}$=0.00, $B_{h1}$=3.300, $A_{h2}$=2.000 and $B_{h2}$=2.400, and in a very particularly preferred embodiment the values are $A_{h1}$=1.420, $B_{h1}$=2.500, $A_{h2}$=2.000 and $B_{h2}$=3.000.

In a preferred embodiment of the novel film, the constants $A_{d1}$ to $B_{d2}$ in equation (2) have the values $A_{d1}$=2.00, $B_{d1}$=3.630, $A_{d2}$=4.40 and $B_{d2}$=2.70, in a particularly preferred embodiment the values are $A_{d1}$=2.400, $B_{d1}$=3.720, $A_{d2}$=4.000 and $B_{d2}$=2.600, and in a very particularly preferred embodiment the values are $A_{d2}$=3.400, $B_{d2}$=2.400, $A_{d3}$=4.000 and $B_{d3}$=3.300.

In the preferred and particularly preferred embodiments, the novel film has particularly high gloss, particularly low haze and a particularly low coefficient of friction. The metalized or oxidically coated film exhibits a particularly good oxygen barrier. The permeabilities of the metalized or oxidically coated film are less than 0.8 cm³/m² bar d.

Figure 2A:
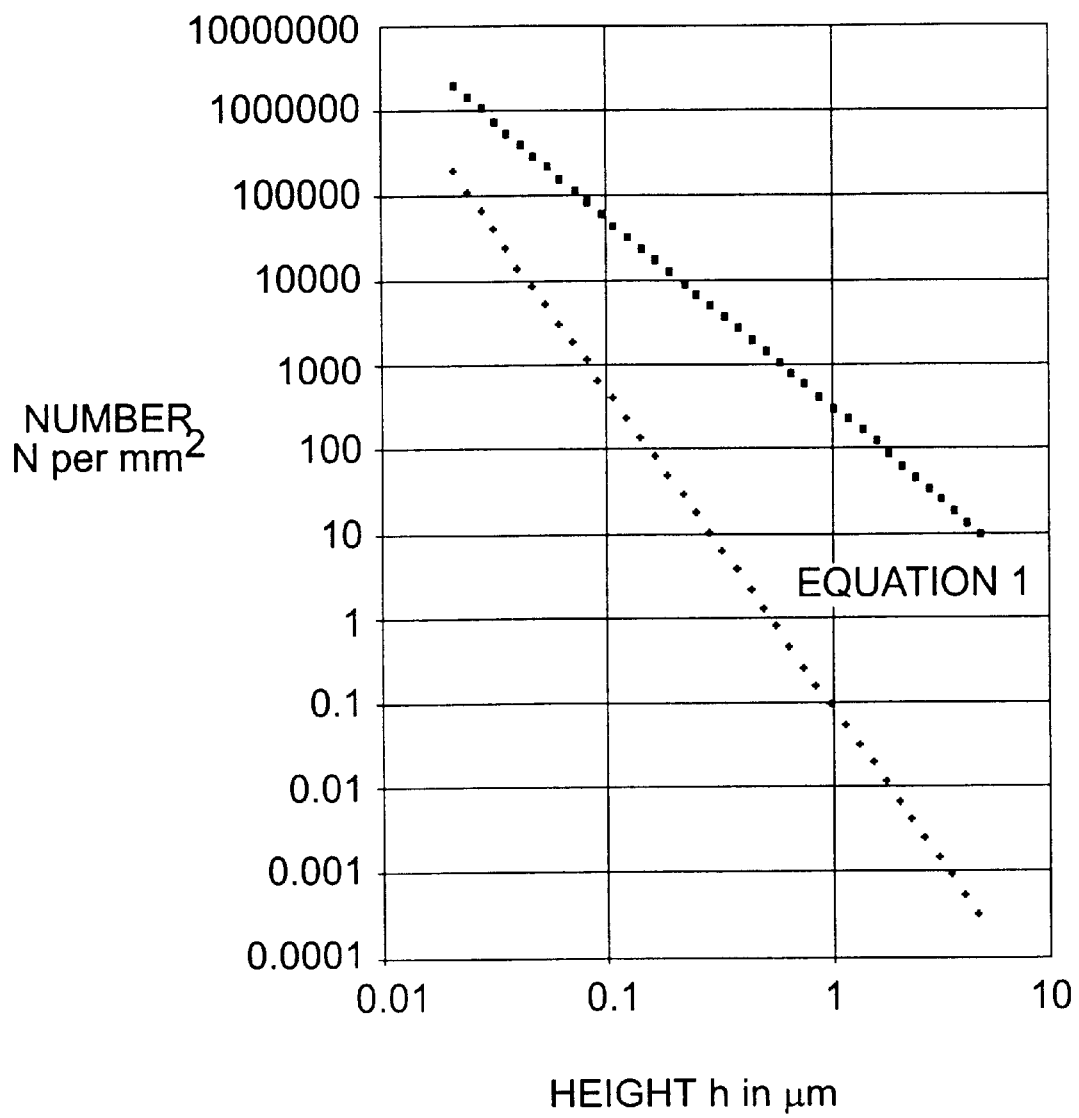
FIG. 2a is a graph showing the relationship of equation 1 of the present invention.
Figure 2B:
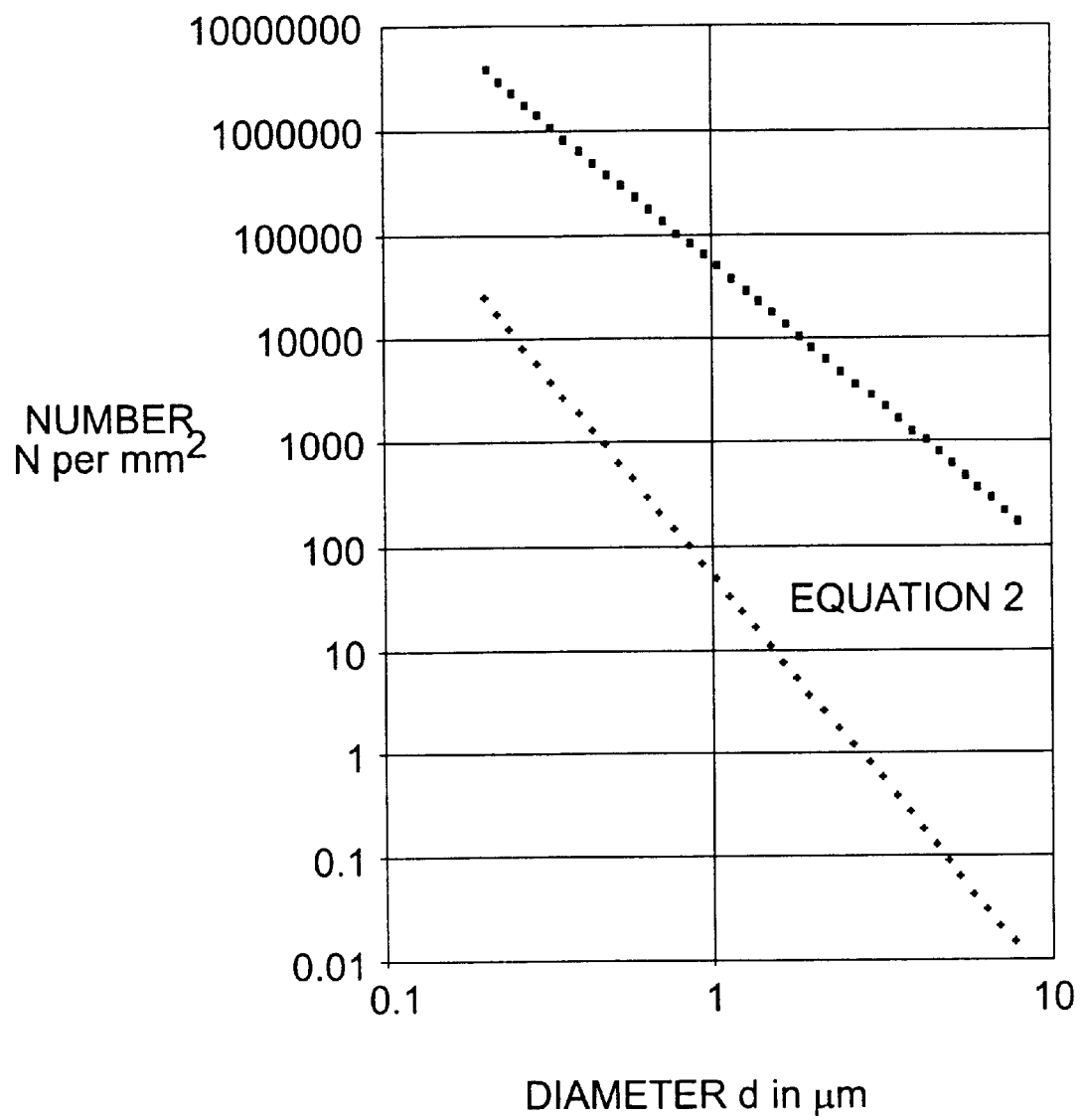
FIG. 2b is a graph showing the relationship of equation 2 of the present invention.

FIGS. 2a and 2b show, respectively, equations (1) and (2) graphically. When shown using two logarithmic axes, both relationships are straight lines defined by the numerical values given.

Relationships similar to equations (1) and (2) are given in the prior art in the abovementioned texts EP-A-0 124 291 and EP-A-0 490 665. However, as already mentioned, films claimed in these texts have excellent slip properties as a result of many very small elevations (". . . excellent slipperiness of the polyester film of this invention is simultaneously achieved by the presence of the many very minute protrusions (page 7)"); the film contains many inert fine particles ("contains many inert solid fine particles (page 9)"), and this is precisely not the case in the novel films.

Figure 3:
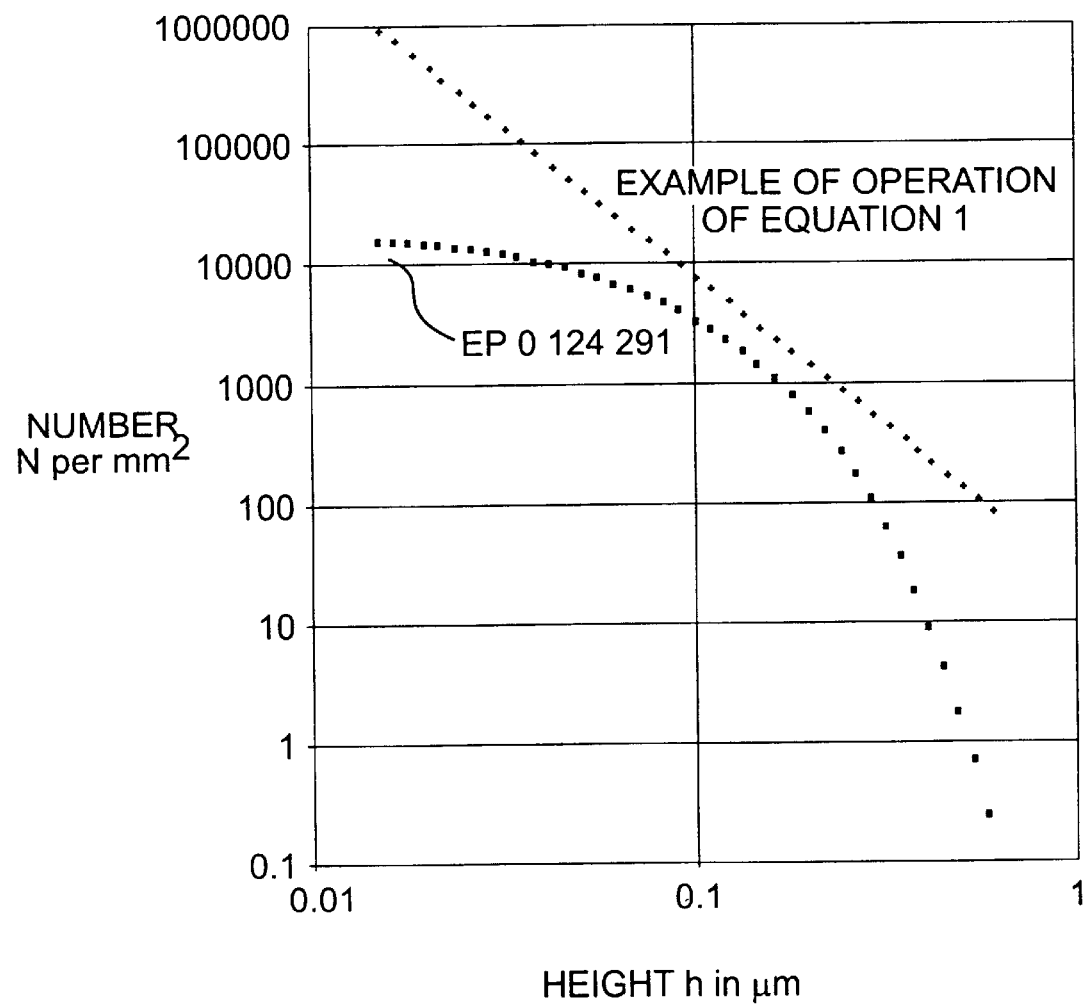
FIG. 3 is a graph showing the relationship of equation 1 of EP 0 124 291.
Figure 4:
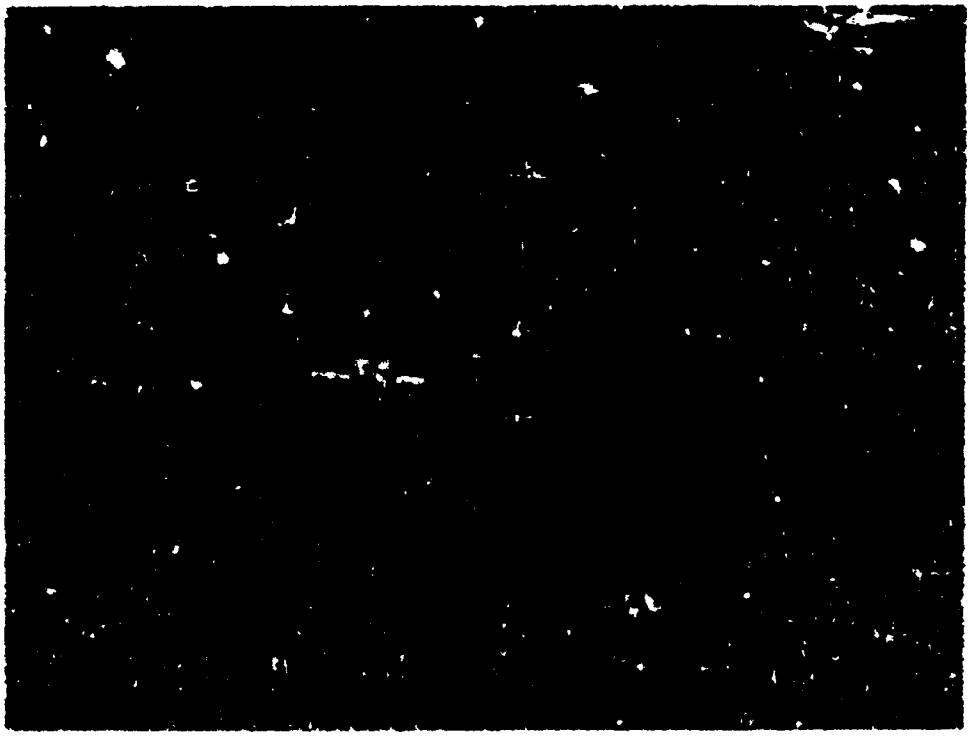
FIG. 4 is an optical microscope photograph of a polyester film.

In addition, the measurement method used in the prior art is markedly different from that used in this application (cf. description of the measurement method hereinafter), Corresponding to this, the topographies of the film surfaces may also differ, as is apparent on comparing the graphs (FIGS. 2a, 2b and 3) and from the comparative examples. For further illustration of the differences between the measurement methods and of the resultant differences in the topography of the films, FIG. 4 shows an optical microscope photograph (DIC, Differential Interference Contrast) of a polyester film. This photograph, taken using reflected light, shows a pigment-filled polyester film. In the method used here (in accordance With the invention), as described hereinafter, all of the elevations/protrusions are recorded by means of a scanning electron microscope and evaluated using an image analysis method. In contrast, the measurement method of the prior art uses a pin which scans the surface at certain distance intervals. As can be seen in the image, straight line traces are left behind by the pin. The image also shows clearly that with this method only a few pigment particles are recorded and the pigment particles are encountered only randomly.

The method of the prior art is thus not reproducible and gives false information.

The comparative examples show quantitatively that, when compared with the prior art, the films in accordance with the present invention have markedly different surface topographies.

The subclaims give preferred embodiments of the invention which are additionally explained below.

In accordance with the invention, the film has at least three layers and has, on the one side of the layer B (base layer) the outer layer A and, on the other side of the layer B, another outer layer C made from polyethylene terephthalate. Both outer layers contain the pigments useful for the production and processing of the film.

In principle, various raw materials may be used for the materials of the various layers. However, it is preferable that the production of the individual layers is based on polyester raw materials.

The base layer B of the film is preferably composed to an extent of at least 90% by weight of a thermoplastic polyester. Polyesters suitable for this are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethyl-cyclohexane and terephthalic acid (poly-1,4-cyclohexanedimethylene terephthalate, PCDT) or from ethylene glycol, naphthalene-2,6-dicarboxylic acid and biphenyl-4,4'-dicarboxylic acid (polyethylene 2,6-naphthalate bibenzoate, PENBB). Particular preference is given to polyesters which are composed to an extent of at least 90 mol %, preferably at least 95 mol %, of ethylene glycol and terephthalic acid units or of ethylene glycol and naphthalene-2,6-dicarboxylic acid units. The remaining monomer units are derived from other aliphatic, cycloaliphatic or aromatic diols and dicarboxylic acids, which may also be present in the layer A (or the layer C).

Examples of other suitable aliphatic diols are diethylene glycol, triethylene glycol, aliphatic glycols of the formula HO—$(CH_2)_n$—OH, where n is an integer from 3 to 6, (in particular 1,3-propanediol, 1,4-butanediol, 1,5-pentanediol and 1,6-hexanediol), or branched aliphatic glycols having up to 6 carbon atoms. Of the cycloaliphatic diols, cyclohexanediols (in particular 1,4-cyclohexanediol) should be mentioned. Examples of other suitable aromatic diols are those of the formula HO—$C_6H_4$—X—$C_6H_4$—OH, where X is —$CH_2$—, —$C(CH_3)_2$—, —$C(CF_3)_2$—, —O—, —S— or —$SO_2$—. Besides these, bisphenols of the formula HO—$C_6H_4$—$C_6H_4$—OH are also very suitable.

Other preferred aromatic dicarboxylic acids are benzenedicarboxylic acids, naphthalenedicarboxylic acids (for example naphthalene-1,4- or 1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Of the cycloaliphatic dicarboxylic acids, mention should be made of cyclohexanedicarboxylic acids (in particular cyclohexane-1,4-dicarboxylic acid). Particularly suitable aliphatic dicarboxylic acids are the $C_3$–$C_{19}$-alkanedioic acids, the alkane part of which may be straight-chain or branched.

The polyesters may be prepared by the transesterification process, the starting materials for which are dicarboxylic esters and diols, which are reacted using the customary transesterification catalysts, such as salts of zinc, calcium, lithium, magnesium and manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

Processes which have proven particularly suitable are those in which transesterification catalysts are used with which only a small number of, and/or only small, elevations/protrusions are created on the surface of the film. Magnesium salts and manganese salts are particularly preferred here. These transesterification catalysts are preferred for preparing the raw material for the base and are particularly preferred for preparing the raw material for the outer layers.

In principle, the same polymers may be used for the outer layers as for the base layer. Besides these, other materials may also be present in the outer layers, in which case the outer layers may preferably be composed of a mixture of polymers, of a copolymer or of a homopolymer which contain ethylene 2,6-naphthalate units and ethylene terephthalate units. Up to 10 mol % of the polymers may be composed of other comonomers (see above).

For any intermediate layers which may be present, it is possible in principle to use the polymers already described for the base layer and the outer layers.

For processing the polymers, it has proven useful to select the polymers for the base layer and the other layer(s) in such a way that the viscosities of the respective polymer melts do riot differ excessively. Otherwise it is likely that there will be additional elevations/protrusions, flow disturbances or streaking in the finished film. To describe the viscosity ranges of the two melts, use is made of a modified solution viscosity (SV). For commercially available polyethylene terephthalates which are suitable for producing biaxially oriented films, the SV values are in the range from 600 to 1000. For the purposes of the present invention, to ensure a satisfactory film quality, the SV of the polymers for the layers A or C should be in the range from 500 to 1200, preferably from 550 to 1150, particularly preferably from 600 to 1000. If necessary, a solid phase condensation may be carried out on the respective granules in order to adjust the SV values of the materials as necessary. The SV values of the polymer melts for the base layer and the other layer(s) should not differ by more than 200 units, preferably by not more than 150 units and in particular by not more than 100 units.

The base layer and the other layer(s) may also contain customary additives, such as stabilizers and/or anti-blocking agents. They are expediently added to the polymer or to the polymer mixture before melting takes place. Examples of stabilizers are phosphorus compounds, such as phosphoric acid and phosphoric esters.

Typical anti-blocking agents (also termed pigments in this context) are inorganic and/or organic particles, for example calcium carbonate, amorphous silicic acid, talc, magnesium carbonate, barium carbonate, calcium sulfate, barium sulfate, lithium phosphate, calcium phosphate, magnesium phosphate, alumina, LiF, the calcium, barium, zinc and manganese salts of the dicarboxylic acids used, carbon black, titanium dioxide, kaolin and crosslinked polystyrene particles and crosslinked acrylate particles.

Selected additives may also be mixtures of two or more different anti-blocking agents or mixtures of anti-blocking agents of the same formulation but of different particle size. The particles may be added to the individual layers in the respective advantageous concentrations, e.g. as glycolic dispersion during the polycondensation or via masterbatches during extrusion. Pigment concentrations of from 0 to 5% by weight have proven particularly suitable. A detailed description of the anti-blocking agents which can be used is found, for example, in EP-A-0 602 964.

To fulfill the equations (1) and (2), and to achieve high gloss and low haze, the novel film is filled only to a comparatively small extent with inert pigments. The concentrations of the inert particles in the outer layers is from 0.01 to 0.2% by weight, preferably from 0.02 to 0.16% by weight, particularly preferably from 0.025 to 0.14% by weight, and very particularly preferably from 0.030 to 0.12% by weight, and depends essentially on the size of the particles used.

For achieving the object of the invention, it has proven expedient to select the concentration of the pigments within the film so that the ash content of the film is less than 0.12%. It is particularly expedient to select the concentration of the pigments within the film so that the ash content of the film is less than 0.10%.

Preferred particles are $SiO_2$ in colloidal and in chain form. These particles are bound very effectively into the polymer matrix, and create vacuols to only a very slight extent. Vacuoles generally cause haze and it is therefore expedient to avoid them. There is no limit in principle on the particle diameters of the particles used. However, to achieve the object of the invention it has proven advantageous to use particles having an average primary particle diameter of less than 100 nm, preferably less than 60 nm and particularly preferably less than 50 nm and/or particles having an average primary particle diameter of greater than 1 µm, preferably greater than 1.5 µm and particularly preferably greater than 2 µm.

The pigmentation of the individual layers unrelated to the outer layers can therefore vary greatly and depends essentially on the structure of the film (layer structure) and the requirements of the film with respect to achievement of other optical properties (haze), and on the behavior in production and processing.

If the film is the preferred film which has three layers, having the base layer B and the two outer layers A and C, the particle concentration in the base layer B is then preferably lower than in the outer layers. The pigmentation in the base layer B should be selected so that it has no adverse effect on the number N of elevations/protrusions in the outer layers in accordance with the invention. In a film of the type mentioned which has three layers, the particle concentration in the base layer B will be from 0 to 0.06% by weight, preferably from 0 to 0.04% by weight, in particular from 0 to 0.03% by weight and very preferably from 0 to 0.02% by weight. There is in principle no restriction on the particle diameter of the particles used, but particles having an average diameter of greater than 1 µm are particularly preferred.

The novel polyester film is built up from three layers and contains the two outer layers A and C. The thickness and formulation of the second outer layer C may be selected independently of the outer layer A, but the second outer layer may likewise contain the polymers or polymer mixtures already mentioned, which, however, need not be identical with those of the first outer layer. The second outer layer may also contain other well known outer layer polymers.

If desired, there may also be an intermediate layer between the base layer and the outer layers. This also may be composed of the polymers described for the base layers. In a particularly preferred embodiment, it is composed of the polyester used for the base layer. It may also contain the customary additives described. The thickness of the intermediate layer is generally greater than 0.3 µm and is preferably in the range from 0.5 to 15 µm, particularly preferably from 1.0 to 10 µm and very particularly preferably from 1.0 to 5 µm.

In the embodiment of the novel film which has three layers, the thickness of the outer layers A and C is generally greater than 0.1 µm and is in the range from 0.2 to 2.0 µm, preferably from 0.2 to 1.8 µm, particularly preferably from 0.3 to 1.6 µm and very particularly preferably from 0.3 to 1.4 µm; the outer layers A and C here may have the same or different thicknesses.

The total thickness of the novel polyester film can vary within wide limits and depends on the intended application. It is from 4 to 50 µm, in particular from 5 to 45 µm, preferably from 6 to 40 µm, the layer B being preferably in a proportion of from 10 to 90% of the total thickness.

To prepare the layers A and C (outer layer(s) A and C), it is expedient to feed pellets of polyethylene terephthalate to one or two extruders. The materials are melted at about 300° C. and extruded.

The polymers for the base layer are expediently fed through another extruder. Any foreign bodies or contamination which may be present can be screened out from the polymer melt before extrusion. The melts are then shaped in a coextrusion die to give flat melt films, and are laminated together. The multilayer film is then drawn off and solidified with the aid of a chill roll and, if desired, other rolls.

The biaxial orientation is generally carried out sequentially. For this, it is preferable to orientate firstly in a longitudinal direction (i.e. in the machine direction) and then in a transverse direction (i.e. perpendicularly to the machine direction). This causes an orientation of the molecular chains. The orientation in a longitudinal direction may be carried out with the aid of two rolls running at different speeds corresponding to the stretching ratio to be achieved. For the transverse orientation, use is generally made of an appropriate tenter frame.

The temperature at which the orientation is carried out can vary over a relatively wide range and depends, on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably 3:1 to 5.5:1. The transverse stretching ratio is generally in the range from 3.0:1 to 5.0:1, preferably from 3.5:1 to 4.5:1. Before the transverse stretching, one or both surfaces of the film may be in-line coated by the known processes. The in-line coating may, for example, serve to improve the adhesion of the metallic layer or of any printing ink which may be applied, or else to improve the antistatic or processing behavior.

In the subsequent heat-setting, the film is held for from about 0.1 to 10 s at a temperature of from 150 to 250° C. The film is then reeled up in a customary manner.

Before printing or before applying the metallic or oxidic layer on one or both sides, the biaxially oriented and heat-set polyester film may be corona- or flame-treated. The intensity of treatment is selected so that the surface tension of the film is generally greater than 45 mN/m.

Metallic or oxidic layers, if desired, are applied in customary industrial systems. Metallic layers of aluminum are usually produced by conventional metalizing (boat method). For oxidic layers, electron-beam processes or application by sputtering have also proven successful. The process parameters for the system during application of the metallic or oxidic layer to the films correspond to the standard conditions. The metalization of the films is preferably carried out so that the optical density of the metalized films is in the usual range from about 2.2 to 2.8. The oxidic layer is applied to the film in such a way that the thickness of the oxide layer is preferably in the range from 30 to 100 nm. The web speed of the film to be coated is usually from 5 to 20 m/s for all settings of variables.

The film may be coated or corona- or flame-pretreated to establish other desired properties. Typical coatings are those which promote adhesion, are antistatic, improve slip or have release action. These additional coatings may be applied to the film via in-line coating using aqueous dispersions, before the transverse orientation.

If the film is metalized, the metallic layer is preferably composed of aluminum. However, other materials which can be applied in the form of a thin, cohesive layer are also suitable. Silicon, for example, is particularly suitable and, in contrast to aluminum, gives a transparent barrier layer. The oxidic layer is preferably composed of oxides of elements of the 2nd, 3rd or 4th main group of the Periodic Table, in particular oxides of magnesium, aluminum or silicon. Use is generally made of those metallic or oxidic materials which can be applied at reduced pressure or in vacuo.

It is an advantage of the invention that the production costs of the novel film are comparable with those in the prior art. The other properties of the novel film which are relevant to its processing and use are essentially unchanged or even improved. Besides this, it has been ensured that reclaim can be used during the production of the film. The term "reclaim" as used herein refers to materials including imperfect or discarded film such as edge trim or leftover film that is recycled and reprocessed with fresh polyethylene terephthalate pellets in production of the novel film. Reclaim can be used in a concentration of from 20 to 50% by weight, based on the total weight of the film, without any significant adverse effect on the physical properties of the film.

The film has excellent suitability for packaging of foodstuffs and luxury foods which are sensitive to light and/or air. Besides this, it is also extremely suitable for industrial use, e.g. in producing hot-stamping foils. It is particularly suitable for producing vacuum packs for coffee, in particular ground coffee.

In summary, the novel film has high gloss and low haze. The film is also an excellent oxygen barrier after it has been metalized or coated with oxidic materials. In addition, it has the good processing behavior desired, in particular on high-speed processing machinery.

The gloss of the film is greater than 170. In a preferred embodiment, the gloss of the film is greater than 180 and in a particularly preferred embodiment greater than 190. The film is therefore suitable in particular for printing or for metalizing. The high gloss of the film is transferred to the print or the applied metallic layer and thus imparts to the film the effective presentational appearance which is wanted.

The haze of the film is less than 1.6. In a preferred embodiment, the haze of the film is less than 1.5, and in a particularly preferred embodiment less than 1.4. Its low haze makes the film suitable not only for packaging but also, for example, for reprographic or glazing applications.

The processing and reeling behavior of the film, in particular on high-speed machinery (reelers, metalizers, printing and laminating machines) is extremely good. The coefficient of friction of the film, which is less than 0.5, is a measure of its processing behavior. In a preferred embodiment, the coefficient is less than 0.4, and in a particularly preferred embodiment less than 0.35. Besides a good thickness profile, excellent layflat and low coefficient of friction, the reeling behavior is decisively affected by the roughness of the film. It has become apparent that the reeling of the film is particularly good if the average roughness is in a range from 20 to 80 nm, while the other properties are retained unchanged. In a preferred embodiment, the average roughness is in the range from 30 to 70 nm, and in a particularly preferred embodiment is from 35 to 60 nm.

The table below (Table 1) shows once again the most important film properties in accordance with the invention.

(3) SV

The SV (solution viscosity) was determined by dissolving a specimen of polyester in a solvent (dichloroacetic acid). The viscosity of this solution and that of the pure solvent were measured in an Ubbelohde viscometer. The quotient was determined from the two values, 1,000 was subtracted from this, and this value multiplied by 1000. The result was the SV.

(4) Coefficient of Friction

The coefficient of friction was determined according to DIN 53 375, 14 days after production.

(5) Surface Tension

The surface tension was determined using the "ink method" (DIN 53 364).

(6) Haze

The haze of the film was measured according to ASTM-D 1003-52. The Hölz haze was determined by a method based on ASTM-D 1003-52, but, in order to utilize the most effective measurement range, measurements were made on four pieces of film laid one on top of the other, and a 1° slit diaphragm was used instead of a 4° pinhole.

(7) Gloss

Gloss was measured according to DIN 67 530. The reflectance was measured as a characteristic optical value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed, representing the light beams hitting the photoelectric detector. The value measured is dimensionless and must be stated together with the angle of incidence.

(8) Determination of the Particle Sizes on Film Surfaces

A scanning electron microscope (e.g. DSM 982 Gemini, Leo GmbH (Zeiss)) together with an image analysis system

TABLE 1

|  | range acording to the invention | preferred | particularly preferred | unit | measurement method |
|---|---|---|---|---|---|
| Gloss, side A (20° angle of measurement)[1] | >170 | >180 | >190 |  | DIN 67 530 |
| Haze[1] | <1.6 | <1.5 | <1.4 | % | ASTM-D 1003-52 |
| Oxygen permeability of the metalized or oxidically coated film | <1 | <0.85 | <0.7 | $gm^{-2} \, d^{-1} \, bar^{-1}$ | DIN 53 380, Part 3 |
| Coefficient of friction: Side A with itself Side C and/or side B, respectively, with itself | <0.5 | <0.4 | <0.35 |  | DIN 53 375 |
| Average roughness $R_a$ Side C and side B, respectively | 20–80 | 30–70 | 35–60 | nm | DIN 4768, with a cut-off of 0.25 nm |

[1]Measured on the unmetalized film

The following methods were used to determine parameters for the raw materials and the films:

(1) Optical Density

The Macbeth TD-904 Densitometer from Macbeth (Division of Kollmorgen Instruments Corp.) was used to measure the optical density. The optical density is defined as $OD = -\lg l/l_0$, where $l$ is the intensity of the incident light, $l_0$ is the intensity of the transmitted light and $l/l_0$ is the transmittance.

(2) Oxygen Barrier

The oxygen barrier of the metalized films was measured using an OX-TRAN 2/20 from Mocon Modern Controls (USA) in accordance with DIN 53 380, Part 3.

was used to determine the size distribution of particles of anti-blocking agent (particle size distribution) on film surfaces. The magnifications selected in all cases were 1700 times.

For these measurements, specimens of film are placed flat on a specimen holder. These are then metalized obliquely at an angle a with a thin metallic layer (e.g. of silver). a here is the angle between the surface of the specimen and the direction of diffusion of the metal vapor. The anti-blocking agent particles throw a shadow in this oblique metalization. Since the shadows are not yet electrically conductive, the specimen can then be further metalized with a second metal (e.g. gold), the metal vapor here impacting vertically onto the surface of the specimen.

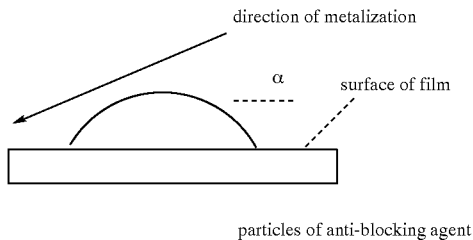

Scanning electron microscope (SEM) images are taken of specimen surfaces prepared in this way. The shadows of the particles of anti-blocking agent are visible because of the contrast between materials. The specimen is oriented in the SEM so that the shadows run parallel to the lower edge of the image (x direction). SEM images are taken with this setting and transferred to an image analysis system. This image analysis system is used to make precise measurements of the lengths of the shadows (in the x direction) and their maximum extent in the y direction (parallel to the vertical edge of the image).

The diameter D of the particles of anti-blocking agent at the surface level of the specimen is equal to the maximum extent of the shadows d in the y direction. The height of the particles of anti-blocking agent, measured from the film surface, can be calculated from the angle a of metalization and the length L of the shadows, given knowledge of the magnification V selected for the SEM image:

$$h=(\tan(\alpha)*L)/V$$

So as to achieve a sufficiently high level of statistical reliability, precise measurements are made of a few thousand particles of anti-blocking agent. With the aid of known statistical methods, frequency distributions are then produced for the diameters and heights of the particles. The class interval selected for this is 0.2 µm for the particle diameter D and 0.05 µm for the particle height h.

(9) Ash Content

The determination of ash content is based on the DIN 53568 and DIN 3451 standards. The pre-ashing of the specimens is carried out not in a naked flame but, without the production of soot, in an electrically heated high-speed ashing apparatus. After ashing, the specimen is calcined in a muffle furnace at 600° C. to constant weight, and then weighed.

(10) Roughness

The roughness $R_a$ of the film was determined according to DIN 4768 with a cut-off of 0.25 nm.

EXAMPLE 1

Polyethylene terephthalate chips (prepared via the transesterification process using Mn as transesterification catalyst; Mn concentration: 100 ppm) were dried at 160° C. to a residual moisture of less than 50 ppm and fed to the extruder for the base layer B.

In addition, polyethylene terephthalate chips (prepared via the transesterification process using Mn as transesterification catalyst; Mn concentration: 100 ppm) which have been pigmented as shown in Table 2 were likewise dried at 160° C. to a residual moisture of less than 50 ppm and fed to the respective extruders for the outer layers A and C.

A transparent film having three layers, symmetrical (ABA) structure and a total thickness of 12 µm was produced by coextrusion followed by stepwise orientation in longitudinal and transverse directions. The thickness of the respective layers is given in Table 2.

| Outer layers A and C (A = C) are a mixture of: | |
|---|---|
| 90.0% by weight of | polyethylene terephthalate having an SV of 800 |
| 10.0% by weight of | masterbatch made from 99.0% by weight of polyethylene terephthalate (SV of 800) and 0.5% by weight of Sylobloc ® 44 H (colloidal SiO$_2$ from Grace) and 0.5% by weight of Aerosil ® TT 600 (chain SiO$_2$ from Degussa) |
| Base layer B: | |
| 100.0% by weight of | polyethylene terephthalate having an SV of 800 |

The production conditions for the individual process steps were:

| Extrusion: | Temperatures | Layer A: | 300° C. |
|---|---|---|---|
| | | Layer B: | 300° C. |
| | | Layer C: | 300° C. |
| | Die gap width: | | 1 mm |
| | Temperature of the take-off roll: | | 30° C. |
| Longitudinal stretching: | Temperature: | | 80–125° C. |
| | Longitudinal stretching ratio: | | 4.0 |
| Transverse stretching: | Temperature: | | 80–135° C. |
| | Transverse stretching ratio: | | 4.0 |
| Setting: | Temperature: | | 230° C. |
| Duration: | | | 3 s |

The film has very good optical properties and good processing behavior (cf. Table 3).

After the film had been produced (in this Example 1 and in all examples below) it was metalized with aluminum in vacuo in an industrial metalizer. The coating speed was 8 m/s and the optical density was 2.6.

The film exhibited the required oxygen barrier. The structure of the film and the properties achieved in films produced in this way are presented in Tables 2 and 3.

EXAMPLE 2

A transparent film having three layers, ABA structure and a total thickness of 12 µm was prepared by coextrusion followed by stepwise orientation in longitudinal and transverse directions, in a similar manner to that of Example 1. Compared with Example 1, only the outer layers were changed.

| Outer layers A are a mixture of: | |
|---|---|
| 88.0% by weight of | polyethylene terephthalate having an SV of 800 |
| 12.0% by weight of | masterbatch made from 99.0% by weight of polyethylene terephthalate (SV of 800) and 0.5% by weight of Sylobloc 44 H (Grace) and 0.5% by weight of Aerosil TT 600 (Degussa) |

The process conditions selected for all layers were as in Example 1.

EXAMPLE 3

A transparent film having three layers, ABA structure and a total thickness of 12 µm was prepared by coextrusion followed by stepwise orientation in longitudinal and transverse directions, in a similar manner to that of Example 1. Compared with Example 1, only the outer layers were changed.

| The outer layers are a mixture of: | |
|---|---|
| 84.0% by weight of | polyethylene terephthalate having an SV of 800 |
| 16.0% by weight of | masterbatch made from 99.0% by weight of polyethylene terephthalate (SV of 800) and 0.5% by weight of Sylobloc 44 H (Grace) and 0.5% by weight of Aerosil TT 600 (Degussa) |

The process conditions selected for all layers were as in Example 1.

EXAMPLE 4

A transparent film having three layers, ABA structure and a total thickness of 12 μm was prepared by coextrusion followed by stepwise orientation in longitudinal and transverse directions, in a similar manner to that of Example 1. Compared with Example 1, only the outer layer A was changed.

| The outer layers are a mixture of: | |
|---|---|
| 80.0% by weight of | polyethylene terephthalate having an SV of 800 |
| 20.0% by weight of | masterbatch made from 99.0% by weight of polyethylene terephthalate (SV of 800) and 0.5% by weight of Sylobloc 44 H (Grace) and 0.5% by weight of Aerosil TT 600 (Degussa) |

The process conditions selected for all layers were as in Example 1.

EXAMPLE 5

A transparent film having three layers, ABA structure and a total thickness of 12 μm was prepared by coextrusion followed by stepwise orientation in longitudinal and transverse directions, in a manner similar to that of Example 3. Compared with Example 3, the thickness of the outer layers was reduced from 1.5 to 1.0 μm. The process conditions selected for all layers were as in Example 1.

EXAMPLE 6

A transparent film having three layers, ABA structure and a total thickness of 12 μm was prepared by coextrusion followed by stepwise orientation in longitudinal and transverse directions, in a manner similar to that of Example 5. Compared with Example 5, the thickness of the outer layers was increased from 1.5 to 2.0 μm

EXAMPLE 7

A transparent film having three layers, ABA structure and a total thickness of 12 μm was prepared by coextrusion followed by stepwise orientation in longitudinal and transverse directions, in a manner similar to that of Example 4. Compared with Example 4, the Aerosil TT 600 was omitted.

EXAMPLE 8

A transparent film having three layers, ABA structure and a total thickness of 12 μm was prepared by coextrusion followed by stepwise orientation in longitudinal and transverse directions, in a manner similar to that of Example 7. Compared with Example 7, the thickness of the outer layers was lowered from 1.5 to 1.0 μm.

COMPARATIVE EXAMPLE 1

Example 1 of EP-A-0 514 129 was repeated. The gloss of the film is unsatisfactory. The metalized version in a thickness of 12 μm did not have the required barrier values.

COMPARATIVE EXAMPLE 2

Example 1 of EP-A-0 604 057 was repeated. The gloss of the film and the reeling of the film is unsatisfactory. In addition, the film does not present a cost-effective solution with respect to use in the packaging market and is also inadequate in respect of its reeling behavior.

COMPARATIVE EXAMPLE 3

Example 1 of EP-A-0 124 291 was repeated.

COMPARATIVE EXAMPLE 4

Example 1 of EP-A-0 490 665 was repeated.

COMPARATIVE EXAMPLE 5

Example 1 of DE-A-16 94 404 was repeated.

COMPARATIVE EXAMPLE 6

Example 15 of EP-A-0 061 769 was repeated.

COMPARATIVE EXAMPLE 7

Example 1 of EP-B-0 088 635 was repeated.

TABLE 2

| Example | Film thickness μm | Film structure | Layer thicknesses A B C μm | Pigments in the layers A | Pigments in the layers B | Pigments in the layers C | Average pigment diameter A | Average pigment diameter μm | Average pigment diameter C | Pigment concentrations B A | Pigment concentrations B ppm | Pigment concentrations B C |
|---|---|---|---|---|---|---|---|---|---|---|---|---|
| Example 1 | 12 | ABA | 1.5/9.0/1.5 | Sylobloc 44 H Aerosil TT 600 | none | Sylobloc 44 H Aerosil TT 600 | 2.5 0.04 | | 2.5 0.04 | 500 500 | 0 0 | 500 500 |
| Example 2 | 12 | ABA | 1.5/9.5/1.5 | Sylobloc 44 H Aerosil TT 600 | none | Sylobloc 44 H Aerosil TT 600 | 2.5 0.04 | | 2.5 0.04 | 600 600 | 0 0 | 600 600 |
| Example 3 | 12 | ABA | 1.5/9.5/1.5 | Sylobloc 44 H | none | Sylobloc 44 H | 2.5 | | 2.5 | 800 | 0 | 800 |

TABLE 2-continued

| Example | Film thickness μm | Film structure | Layer thicknesses A B C μm | Pigments in the layers A | B | C | Average pigment diameter A | μm | C | Pigment concentrations A | B ppm | C |
|---|---|---|---|---|---|---|---|---|---|---|---|---|
| Example 4 | 12 | ABA | 1.5/9.5/1.5 | Aerosil TT 600 Sylobloc 44 H | none | Aerosil TT 600 Sylobloc 44 H | 0.04 2.5 | | 0.04 2.5 | 800 1000 | 0 0 | 800 1000 |
| Example 5 | 12 | ABA | 1.0/9.5/1.0 | Aerosil TT 600 Sylobloc 44 H | none | Aerosil TT 600 Sylobloc 44 H | 0.04 2.5 | | 0.04 2.5 | 1000 800 | 0 0 | 1000 800 |
| Example 6 | 12 | ABA | 2.0/9.5/1.0 | Aerosil TT 600 Sylobloc 44 H | none | Aerosil TT 600 Sylobloc 44 H | 0.04 2.5 | | 0.04 2.5 | 800 800 | 0 0 | 800 800 |
| Example 7 | 12 | ABA | 1.5/9.5/1.5 | Aerosil TT 600 Sylobloc 44 H | none | Aerosil TT 600 Sylobloc 44 H | 0.04 2.5 | | 0.04 2.5 | 800 1000 | 0 0 | 800 1000 |
| Example 8 | 12 | ABA | 1.0/9.5/1.5 | Sylobloc 44 H | none | Sylobloc 44 H | 2.5 | | 2.5 | 1000 | 0 | 1000 |
| Comp. Ex. 1 | 75 | ABA | 4/68/4 | Glass beads Aerosil OX 50 | none | Glass beads Aerosil OX 50 | 2.7 0.04 | | 2.7 0.04 | 300 1200 | 0 0 | 300 1200 |
| Comp. Ex. 2 | 60 | ABA | 1.5/63/1.5 | Tosperl 130 | none | Tosperl 130 | 3.0 | | 3.0 | 600 | 0 | 600 |
| Comp. Ex. 3 | 10 | A | — | Anatase - TiO$_2$ | | | | 0.4 | | | 1500 | |
| Comp. Ex. 4 | 14 | A | — | θ - Al$_2$O$_3$ | | | | 0.2 | | | 3000 | |
| Comp. Ex. 5 | 25 | ABA | 2.5/20/2.5 | kaolin | — | kaolin | 4 | | 4 | 1250 | | 1250 |
| Comp. Ex. 6 | 15 | AB | 7.5/7.5 | zinc acetate antimony trioxide | | kaolin + lubricant as coating | | | | 230 400 | 5000 + solution | |
| Comp. Ex. 7 | 12 | AB | 6/6 | — | | internal particles | | 1.5 | | | 2000 | |

TABLE 3

| | Constants for the height distribution of the particles | | Constants for the thickness distribution of the particles | | Oxygen barrier | Coefficient friction | | Roughness R$_a$ | | Gloss[1] | | Haze[1] | Processing |
|---|---|---|---|---|---|---|---|---|---|---|---|---|---|
| | A$_h$ | B$_h$ | A$_d$ | B$_d$ | cm³/m² | μk | | Side A | Side C | | | | |
| Example | Side A/Side C | | Side A/Side C | | bar d | A/A | C/C | nm | nm | Side A | Side C | % | behavior |
| Example 1 | 1.3/1.3 | 2.7/2.7 | 3.0/3.0 | 2.4/2.4 | 0.58 | 0.46 | 0.46 | 45 | 45 | 200 | 200 | 1.1 | good |
| Example 2 | 1.478/1.478 | 2.6/2.6 | 3.18/3.18 | 2.33/2.33 | 0.65 | 0.4 | 0.4 | 50 | 52 | 195 | 195 | 1.2 | very good |
| Example 3 | 1.6/1.6 | 2.6/2.6 | 3.3/3.3 | 2.3/2.3 | 0.7 | 0.35 | 0.35 | 55 | 56 | 190 | 190 | 1.3 | very good |
| Example 4 | 1.7/1.7 | 2.6/2.6 | 3.4/3.4 | 2.4/2.4 | 0.90 | 0.33 | 0.33 | 60 | 60 | 175 | 175 | 1.4 | very good |
| Example 5 | 1.61/1.61 | 2.6/2.6 | 3.31/3.31 | 2.3/2.3 | 0.75 | 0.35 | 0.35 | 53 | 55 | 195 | 190 | 1.1 | very good |
| Example 6 | 1.62/1.62 | 2.58/2.58 | 3.32/3.32 | 2.31/2.31 | 0.78 | 0.4 | 0.4 | 55 | 60 | 185 | 185 | 1.4 | very good |
| Example 7 | 1.7/1.7 | 2.57/2.57 | 3.35/3.35 | 2.4/2.4 | 0.8 | 0.4 | 0.4 | 50 | 52 | 190 | 190 | 1.2 | very good |
| Example 8 | 1.71/1.71 | 2.57/2.57 | 3.36/3.36 | 2.4/2.4 | 0.75 | 0.4 | 0.4 | 54 | 55 | 195 | 190 | 1.1 | good |
| Comp. Ex. 1 | | | | | 1.3 | 0.46 | 0.46 | 35 | 35 | 160 | 160 | 1.0 | good |
| Comp. Ex. 2 | | | | | 0.6 | 0.26 | 0.26 | 55 | 55 | 165 | 165 | 0.6 | moderate |
| Comp. Ex. 3 | | | | | 2.4 | 0.15 | | 10 | | 130 | | 7 | good |
| Comp. Ex. 4 | | | | | 3.1 | 0.2 | | 20 | | 120 | | 9 | good |
| Comp. Ex. 5 | | | | | 1.7 | 0.4 | | 75 | | 175 | | 1.5 | good |
| Comp. Ex. 6 | | | | | 1.8 | blocks | 0.4 | 3.6 | 15 | 175 | 130 | 9 | bad |
| Comp. Ex. 7 | | | | | 0.45 | blocks | 0.3 | 3 | 14 | 180 | 150 | 5 | very bad |

[1]Measured on the unmetalized film
Side A: metallized outer layer
Side C: unmetallized outer layer

What is claimed is:

1. A biaxially oriented, coextruded polyester film which has at least three layers and has at least a base layer B which is composed to an extent of at least 95% by weight of polyethylene terephthalate and has, applied to this base layer, outer layers A and C which contain internal and/or inert particles, where the outer layers A and C have a number of elevation/protrusions N per mm² of film surface area which is related to their respective heights h and diameter d by the following equations $$A_{h1} - B_{h1} * \log h/\mu m < \log N/mm^2 < A_{h2} - B_{h2} * \log h/\mu m \quad (1)$$

$$0.01 \, \mu m < h < 10 \, \mu m$$

$$A_{h1} = -1.000; \; B_{h1} = 3.70$$

$$A_{h2} = 2.477; \; B_{h2} = 2.22$$

$$A_{d1} - B_{d1} * \log d/\mu m < \log N/mm^2 < A_{d2} - B_{d2} * \log d/\mu m \quad (2)$$

$$0.4 \, \mu m < d < 10 \, \mu m$$

$$A_{d1} = 1.700; \; B_{d1} = 3.86$$

$$A_{d2} = 4.700; \; B_{d2} = 2.70.$$

2. A polyester film as claimed in claim 1, wherein the outer layers contain less than 0.20% by weight of an inert filler.

3. A polyester film as claimed in claim 1, wherein the film is a metalized or oxidically coated film having an oxygen transmission of $\leq 1.0 \, cm^3/m^2 bar \, d$.

4. A polyester film as claimed in claim 3, wherein the metallized or oxidically coated film has an oxygen transmission of $\leq 0.80 \, cm^3/m^2 \, bar \, d$.

5. A polyester film as claimed in claim 1, wherein the layer A has a glass transition temperature higher than that of the base layer B.

6. A polyester film is claimed in claim 1, wherein the outer layers have a thickness of from 0.1 to 2. μm.

7. A polyester film as claimed in claim 1, which is built up from three layers and is composed of an outward-facing outer layer A, the base layer B and a second outer layer C which is applied to the side of the base layer B opposite to that of the outer layer A.

8. A polyester film as claimed in claim 7, wherein the outer layers are pigmented.

9. A polyester film as claimed in claim 8, wherein the outer layers are differently pigmented.

10. A polyester film as claimed in claim 9, wherein at least one outer layer is in-line coated.

11. A polyester film as claimed in claim 8, wherein at least one outer layer is in-line coated.

12. A polyester film as claimed in claim 1, wherein the outer layers are pigmented.

13. A polyester film as claimed in claim 1, wherein the outer layers are differently pigmented.

14. A polyester film as claimed in claim 1, wherein at least one outer layer is in-line coated.

15. A process for producing a biaxially oriented, multi-layer polyester film as claimed in claim 1, in which polyester melts corresponding to the formulations of the outer and base layers are fed to a coextrusion die, extruded from this die on a cooling roll, and the resultant prefilm is then biaxially oriented and heat-set, wherein the outer layers have a number of elevations/protrusions N per mm$^2$ of film surface area which is related to their respective heights h and diameter d by the following equations $$A_{h1} - B_{h1} * \log h/\mu m < \log N/mm^2 < A_{h2} - B_{h2} * \log h/\mu m \quad (1)$$

$$0.01 \, \mu m < h < 10 \, \mu m$$

$A_{h1} = -1.000; \ B_{h1} = 3.70$ $A_2 = 2.477; \ B_{h2} = 2.22$ $$A_{d1} - B_{d1} * \log d/\mu m < \log N/mm^2 < A_{d2} - B_{d2} * \log d/\mu m \quad (2)$$

$$0.4 \, \mu m < d < 10 \, \mu m$$

$A_{d1} = 1.700; \ B_{d1} = 3.86$ $A_{d2} = 4.700; \ B_{d2} = 2.70$.

16. A process for producing a biaxially oriented, multi-layer polyester film, as claimed in claim 15, in which reclaim is introduced to the coextrusion die in a concentration of from 10 to 50% by weight, based on the total weight of the film.

17. A method for packaging of foodstuffs which comprises packaging said foodstuffs in a polyester film as claimed in claim 1.

18. A method for the production of hot-stamping foils which comprises producing said hot-stamping foils from a polyester film as claimed in claim 1.

* * * * *

UNITED STATES PATENT AND TRADEMARK OFFICE
CERTIFICATE OF CORRECTION

PATENT NO. : 6,291,053 B1
DATED : September 18, 2001
INVENTOR(S) : Herbert Peiffer et al.

It is certified that error appears in the above-identified patent and that said Letters Patent is hereby corrected as shown below:

Title page,
Item [54], Title, line 2, before "THE USE", delete "AND".

Column 21, claim 6,
Line 4, "is claimed in claim 1" should read -- as claimed in claim 1 --.
Line 5, "2. μm" should read -- 2.0 μm --.

Column 22, claim 15,
Line 10, "$A_2$" should read -- $A_{h2}$ --.

Signed and Sealed this

Sixteenth Day of April, 2002

Attest:

JAMES E. ROGAN
*Attesting Officer*  *Director of the United States Patent and Trademark Office*